United States Patent
Hakozaki

(10) Patent No.: US 6,234,845 B1
(45) Date of Patent: May 22, 2001

(54) IC CARD CONNECTOR WITH A MECHANISM FOR PREVENTING ERRONEOUS INSERTION OF AN IC CARD

(75) Inventor: Hirotoshi Hakozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/301,449

(22) Filed: Apr. 29, 1999

(30) Foreign Application Priority Data

Aug. 27, 1998 (JP) .................................................. 10-241497

(51) Int. Cl.⁷ ............................ H01R 33/02; H01R 33/08
(52) U.S. Cl. ......................... 439/633; 361/737; 235/448
(58) Field of Search .................................... 439/630, 633; 235/486, 492, 483; 361/737, 756, 802, 801

(56) References Cited

U.S. PATENT DOCUMENTS

| | | | |
|---|---|---|---|
| 5,448,047 | * 9/1995 | Nair et al. ............................ | 235/440 |
| 5,569,898 | * 10/1996 | Fisher et al. .......................... | 235/448 |
| 5,906,516 | * 5/1999 | Sato et al. ............................. | 439/630 |
| 6,097,605 | * 8/2000 | Klatt et al. ............................ | 361/737 |

FOREIGN PATENT DOCUMENTS 2-266998    10/1990  (JP) .

* cited by examiner

*Primary Examiner*—Khiem Nguyen
*Assistant Examiner*—Michael C. Zarroli
(74) *Attorney, Agent, or Firm*—Sughrue, Mion, Zinn, Macpeak & Seas, PLLC

(57) ABSTRACT

An IC card connector capable of handling an IC card having embossed data rows with a simple and small-size structure of high mechanical strength is provided. The IC card connector includes a connector body for accommodating an IC card having a contact array and embossed data rows. An IC card receiving port is provided at one end of the connector body for receiving the IC card. A guide mechanism is provided along both sides of the IC card receiving port for guiding insertion of the IC card and grooves are formed in portions of the connector body along the direction in which the IC card is inserted so that the embossed data rows can move through the grooves.

4 Claims, 3 Drawing Sheets

IC CARD CONNECTOR WITH A MECHANISM FOR PREVENTING ERRONEOUS INSERTION OF AN IC CARD

BACKGROUND OF THE INVENTION

1. Field of the Invention

The present invention relates to an IC card connector capable of accommodating an IC card (i.e., card incorporating an integrated circuit or the like) which is provided with at least one embossed data field or row. More particularly, the present invention is concerned with an IC card connector which is imparted with a function for preventing erroneous insertion of an IC card and which can be applied advantageously and profitably to an automobile-onboard terminal for an automated road toll charging/collecting system and the like.

2. Description of Related Art

In recent years, IC cards incorporating an IC memory in which personal data can be readably written are widely employed for personal identification, automated monetary or other transactions and applications. The fields in which these IC cards find utilization is increasing. Such being the circumstances, the number of IC cards is increasing.

In general, the IC card of this type is adapted to be inserted into an IC card connector designed for reading data from the IC card. In the state of the art, various approaches have been made for enabling the IC card to be inserted into the IC card connector correctly with enhanced reliability. By way of example, there may be mentioned an arrow printed on the IC card for indicating the inserting direction and an erroneous insertion preventing mechanism provided for the IC card connector in order to prevent erroneous insertion of the IC card in the IC card connector.

Furthermore, there are used a variety of cards provided with embossed data row or rows having character information, such as cash cards and credit cards. Such being the case, an IC card connector is in demand with a structure that is capable of accommodating an IC card having embossed data row(s) as well. IC card having embosse data row(s) as well.

For having better understanding of the present invention, background techniques thereof will be described by reference to FIGS. 5 and 6 which show in perspective views, respectively, a conventional IC card and a conventional IC card connector known heretofore which is provided with an erroneous insertion preventing mechanism implemented by resorting to a unique geometrical configuration, as disclosed, for example, in Japanese Unexamined Patent Application Publication No. 266998/1990 (JP-A-2-266998).

Referring to FIG. 5, an IC card 1 includes a contact array 11 mounted on a top surface thereof, being exposed so as to serve as electrodes for an IC memory. One lateral edge portion of the IC card 1 is bent substantially in an L-like shape as viewed in cross section, whereby a bent edge 2 is formed.

On the other hand, an IC card connector 3 adapted for reading out information carried by the IC card 1 includes a slot 4 having a width H and a clearance W which allow the IC card 1 to be inserted therein, wherein a bent slot portion 4a is formed at one lateral end of the slot 4, as can be seen in FIG. 6.

Provided internally of the IC card connector 3 is a contact pin array (not shown) which is resiliently pressed onto the contact array 11 of the IC card 1. When the IC card 1 is inserted into the IC card connector to a proper position, the contact pin array is brought into electric contact with the contact array 11 to thereby enable the operation for reading out information or data from the IC card 1.

The bent slot portion 4a of the slot 4 is formed in a shape which coincides with that of the bent edge 2 of the IC card. By virtue of this arrangement, only the IC card 1 inserted into the IC card connector 3 in the correct orientation can be received and accommodated within the IC card connector 3 by way of the slot 4 and the bent slot portion 4a.

By using the IC card 1 formed with the bent edge 2 in combination with the IC card connector 3 provided with the slot 4 having the bent slot portion 4a of the shape coinciding with that of the bent edge 2 of the IC card, as described above, it is certainly possible to prevent the erroneous insertion of the IC card 1.

However, the IC card 1 is required to be formed in a unique geometrical configuration, as can be seen in FIG. 5. In addition, the erroneous insertion preventing function of the IC card connector 3 is effective only for the IC card 1 with the unique geometrical configuration, as can be seen in FIG. 6.

FIG. 7 is a side elevational view showing schematically another conventional IC card connector known heretofore in the state where an IC card 1A having an embossed data row 5 is inserted erroneously. Referring to FIG. 7, the IC card connector 3A is provided with a slot 4 which presents a relatively small clearance WA of a constant size over the whole width so that the IC card connector 3A can handle the IC card provided with no embossed data row 5.

In the case of the IC card and the IC card connector shown in FIG. 7, user tries to insert forcibly the IC card 1A having the embossed data row 5 into the slot 4. As a result of this, the slot 4 is partially expanded by the embossed data row 5. Thus, distortion occurs in the IC card connector 3A as indicated by 3d.

In general, the clearance defined by the slot of the IC card connector is formed to be constant over the whole width of the slot. Accordingly, the IC card connector can not deal with the IC card 1A having the embossed data row 5. When the clearance WA is dimensioned in a small size for the purpose of implementing the IC card connector in a small size or miniaturized structure, as illustrated in FIG. 7, interference between the embossed data row 5 and the slot 4 will occur to make it difficult to insert the IC card 1A due to an excessively large friction.

Furthermore, when the distortion 3d takes place due to the interference with the embossed data row 5, as shown in FIG. 7, contact pressure between the contact pin array provided internally of the IC card connector 3A and the contact array of the IC card 1A becomes insufficient, incurring undesirably a contact failure.

On the other hand, in case the clearance of the slot is formed in a large size with a view to evading interference with the embossed data row 5, the IC card connector will necessarily be realized in a large size. In that case, sufficient thickness can not be assured for a member which forms or defines the slot. This in turn means that sufficient strength can not be ensured for the IC card connector receiving portion of the IC card connector which is thus likely to undergo warp and distortion.

Additionally, when the clearance of the slot of the IC card connector is selected large, the IC card 1A having the embossed data row 5 inserted upside down may unwantedly be received by the IC card connector without any appreciable interference. In other words, erroneous insertion of the IC card 1A may possibly take place.

As will be appreciated from the foregoing, the conventional IC card connector 3 having the slot 4 of the unique geometrical configuration only for the purpose of preventing the erroneous insertion (see FIG. 6) is necessarily limited to handling only of the IC card 1 having a similar unique geometrical configuration (shown in FIG. 5), giving rise to the problem that this IC card connector can not handle other types of cards.

On the other hand, when the clearance WA of the slot 4 of the IC card connector 3A is designed in a small size with a view to realizing the IC card connector 3A in a small size, as shown in FIG. 7, proper insertion of the IC card 1A having the embossed data row 5 is rendered difficult or impossible, incurring occurrence of the distortion 3d due to interference between the embossed data row 5 and the slot 4, as a result of which various inconveniences are involved, to another problem.

On the other hand, when the clearance of the slot of the IC card connector is enlarged with a view to avoiding interference with the embossed data row 5, it will become difficult or impossible to ensure a high strength for the structure constituting the slot. Besides, erroneous insertion of the IC card can not be prevented at all, to another disadvantage.

SUMMARY OF THE INVENTION

In light of the state of the art described above, it is an object of the present invention to provide an IC card connector which can cope with an IC card having an embossed data row and ensure an erroneous insertion preventing function with an extremely simple structure.

Further, a second object of the present invention is to provide an IC card connector which can be effectively and profitably used as an automobile-onboard terminal for an automated road toll charging/collecting system (also known as electronic toll collecting system or ETC in abbreviation).

In view of the above and other objects which will become apparent as the description proceeds, there is provided according to a general aspect of the present invention an IC card connector, which includes a connector body for accommodating therein an IC card having a contact array and embossed data rows, an IC card receiving port provided at one end of the connector body for receiving the IC card being inserted, a guide means provided at both sides of the IC card receiving port for guiding insertion of the IC card along both lateral edge portions thereof, grooves formed in portions of the connector body along the direction in which the IC card is inserted so that the embossed data rows can move through the grooves, and a contact pin array incorporated in the connector body for making electric contact with a contact array of the IC card accommodated within the connector body.

By virtue of the arrangement described above, there can be realized an IC card connector which can handle the IC card having the embossed data rows with a simplified and miniaturized structure without incurring degradation in the mechanical strength.

In a preferred mode for carrying out the invention, the IC card destined to be inserted into the connector body may have embossed data rows formed at a plurality of locations distanced one another in a direction orthogonal to an inserting direction in which the IC card is inserted into the IC card receiving port, and the grooves of the connector body may be formed at a plurality of locations corresponding to the plural embossed data rows.

With the arrangement described above, there can be realized an IC card connector which can handle the IC card having the embossed data rows with a simple and small-size structure which can ensure sufficient mechanical strength.

In another preferred mode for carrying out the invention, the plural embossed data rows of the IC card to be inserted into the connector body may be provided at both sides of the contact array, wherein widths of the embossed data rows may be made to differ from each other, and the widths of the plural grooves formed in the connector body may be so designed as to differ from each other correspondingly to the widths of the plural embossed data rows.

Owing to the arrangement described above, there can be realized an IC card connector which can handle the IC card having the embossed data rows with a simple and small-size structure which ensures sufficient mechanical strength.

In yet another preferred mode for carrying out the invention, the IC card receiving port of the connector body having the grooves may be so arranged as to serve as an erroneous insertion preventing mechanism for preventing erroneous insertion of the IC card.

With the arrangement described above, there can be realized an IC card connector which is imparted with a function for preventing erroneous insertion of an IC card and which can handle the IC card having embossed data rows with a simple and small-size structure of high mechanical strength.

In a further preferred mode for carrying out the invention, the IC card adapted to be inserted into the connector body may carry pertinent data for an automated road toll charging/collecting system, and the connector body may be mounted on a motor vehicle as an onboard terminal for the automated road toll charging/collecting system.

By virtue of the arrangement described above, there can be realized an IC card connector which is imparted with a function for preventing erroneous insertion of an IC card and which can handle the IC card having embossed data rows with a simple and small-size structure of high mechanical strength. Besides, there can be realized an IC card connector suited advantageously and effectively for the use in combination with to an automobile-onboard terminal of the automated road toll charging/collecting system.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
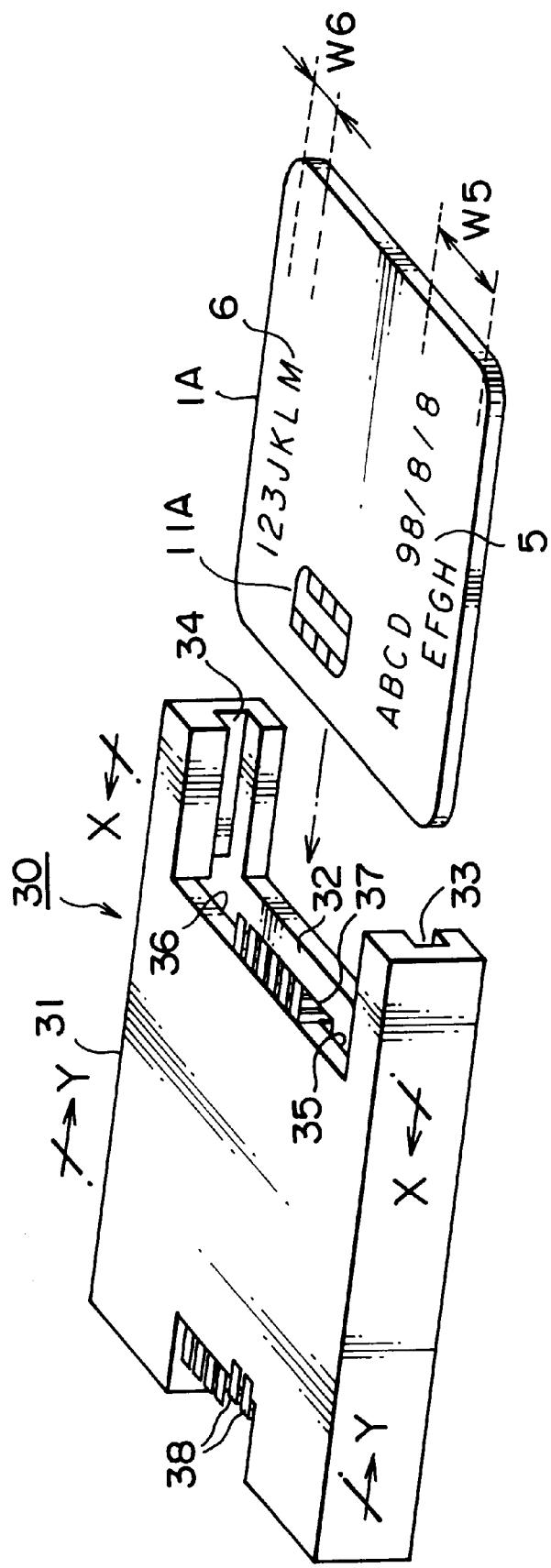
FIG. 1 is a perspective view showing an IC card and an IC card connector according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Figure 2:
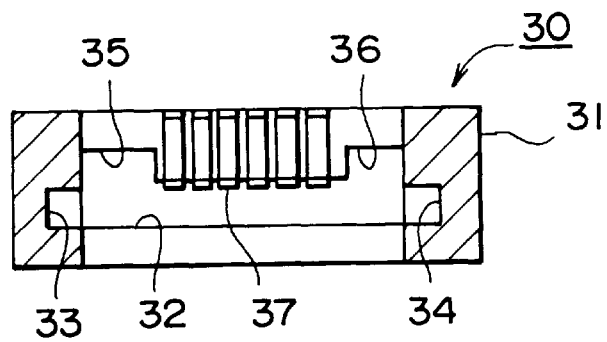
FIG. 2 is a sectional view taken along a line X—X in FIG. 1.
Figure 3:
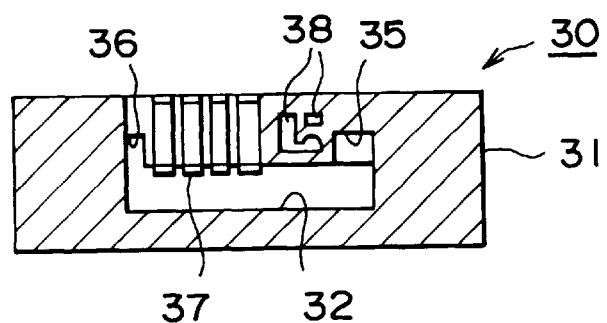
FIG. 3 is a sectional view taken along a line Y—Y in FIG. 1.

A first embodiment of the present invention will now be described by reference to the drawings. FIG. 1 is a perspective view showing an IC card and an IC card connector according to a first embodiment of the present invention, FIG. 2 is a sectional view taken along a line X—X in FIG. 1, and FIG. 3 is a sectional view taken along a line Y—Y in FIG. 1. In these figures, like components as those mentioned hereinbefore are denoted by like reference characters and repetitive description thereof is omitted.

Referring to FIG. 1, an IC card 1A includes a contact array 11A and embossed data rows 5 and 6 provided at predetermined locations recommended by the Japanese Industrial Standards (JIS). As shown in FIGS. 1 to 3, an IC card connector 30 includes a connector body 31 for receiving and accommodating the IC card 1A.

An IC card receiving port 32 is provided at one end of the connector body 31. The IC card 1A can be inserted into the IC card receiving port 32, as indicated by a broken line arrow. A pair of guide recesses 33 and 34 are provided in association with the IC card receiving port 32 at both sides thereof for guiding the insertion of the IC card 1A along both lateral edges thereof.

A pair of grooves 35 and 36 are formed partially in an inner surface of a top wall of the connector body 31 so as to extend in the direction in which the IC card 1A is inserted. Owing to these grooves 35 and 36, the IC card 1A can be inserted into the connector body 31 without incurring interference between the embossed data rows 5 and 6 and the inner top wall of IC card accommodating chamber of the connector body 31. At this juncture, it should be mentioned that the portions of the top wall members of the connector body 31 which define the grooves 35 and 36, respectively, may be formed thin in order to realize the connector body 31 in a small-size structure.

A contact pin array 37 including pins formed resiliently are so provided in the connector body 31 as to project into the IC card receiving port 32. A mount for the contact pin array 37 is disposed between the grooves 35 and 36 and has a large thickness for ensuring a sufficient mechanical strength.

The pins of the contact pin array 37 are brought into electrically contact with the contacts of the contact array 11A of the IC card accommodated within the connector body 31 so that data read out from the IC card 1A by way of the contact array 11A and the contact pin array 37 can be supplied to an external processing circuit (not shown).

Additionally, a detecting switch 38 is provided at an end portion of the connector body 31. The detecting switch 38 is actuated by a tip end portion of the IC card 1A for detecting that the IC card 1A has been inserted fully or completely within the card accommodating chamber of the connector body 31.

As can be seen in FIG. 1, the embossed data rows 5 and 6 of the IC card 1A are formed at separate locations distanced orthogonally relative to the direction in which the IC card 1A is inserted into the IC card receiving port 32 of the connector body 31, while the grooves 35 and 36 are formed in the top wall of the card accommodating chamber with a distance therebetween which corresponds to that intervening between the embossed data rows 5 and 6.

More specifically, the embossed data rows 5 and 6 are provided at both sides of the contact array 11A, wherein the widths W5 and W6 of the embossed data rows 5 and 6 differ from each other. In the case of the illustrated embodiment of the invention, the width W5 of the embossed data row 5 is selected to be greater than the width W6 of the embossed data row 6, i.e., W5>W6. Accordingly, the widths of the grooves 35 and 36 differ from each other in correspondence to the widths W5 and W6 of the embossed data rows 5 and 6.

In this way, by providing the grooves 35 and 36 having mutually different widths W5 and W6 in association with the IC card receiving port 32 of the connector body 31, an erroneous insertion preventing function can be imparted to the IC card connector 30 for preventing erroneous insertion of the IC card 1A. More specifically, when the IC card 1A is inserted in the normal orientation, no interference occurs between the embossed data rows 5 and 6 of the IC card 1A and the IC card receiving port 32, whereby the IC card 1A can be inserted smoothly into the connector body 31. On the other hand, when the IC card 1A is inserted upside-down or frontside-rear, interference will occur between the embossed data rows 5 and 6 and the IC card receiving port 32 of the connector body 31, whereby further insertion of the IC card 1A into the IC card 1 can be prevented.

Since the positions or locations of the embossed data rows 5 and 6 on the IC card 1A as well as the widths W5 and W6 and the height of the embossed data rows 5 and 6 are selected so as to fall within the range of values stipulated in the Japanese Industrial Standards (JIS), the connector body 31 realized in the structure described above by reference to FIG. 1 can exhibit the erroneous insertion preventing function substantially for all types of cards.

Figure 4:
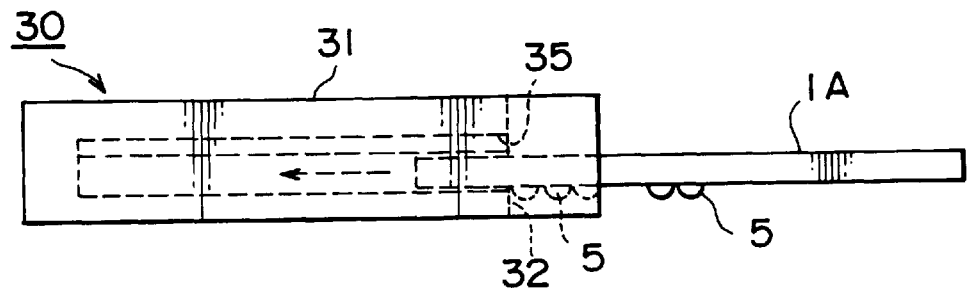
FIG. 4 is a side elevational view showing schematically a state where an IC card is inserted erroneously in the IC card connector according to an embodiment of the present invention.
Figure 5:
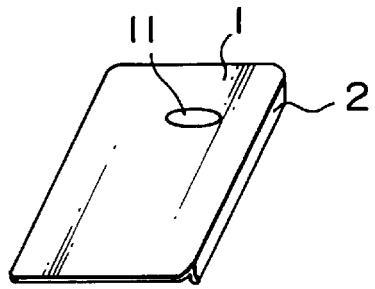
FIG. 5 is a perspective view showing a conventional IC card which is provided with an erroneous insertion preventing mechanism.
Figure 6:
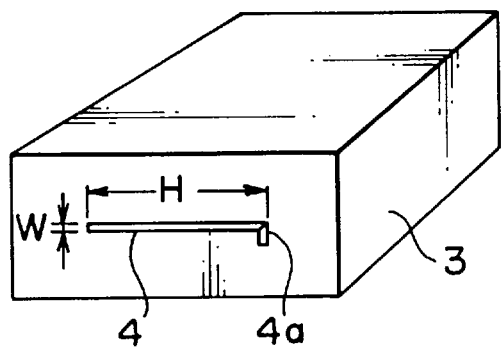
FIG. 6 is a perspective view showing a conventional IC card connector which is provided with an erroneous insertion preventing means.

FIG. 4 is a side elevational view for illustrating a state in which the IC card 1A is being inserted erroneously upside-down. As can be seen in the figure, interference occurs between the embossed data row 5 and the IC card receiving port 32 to inhibit further insertion of the IC card 1A. In this manner, erroneous insertion of the IC card 1A can be positively prevented.

To say in another way, the IC card connector 30 can exhibit the erroneous insertion preventing function upon insertion of the IC card 1A having the embossed data row(s) to inhibit the IC card 1A inserted upside-down from being further fed into the card accommodating chamber beyond the position where interference occurs between the embossed data rows 5 and 6 and the IC card receiving port 32.

In the card insertion state illustrated in FIG. 4, it is assumed that the IC card 1A is inserted upside-down. However, insertion of the IC card 1A frontside-rear (i.e., insertion in the reversed feeding direction) can be equally prevented by virtue of the arrangement that the widths of the grooves 35 and 36 differ from each other in correspondence to the mutually different widths W5 and W6 of the embossed data rows 5 and 6. Thus, erroneous insertion of the IC card 1A upside-down or frontside-rear can be prevented.

Figure 7:
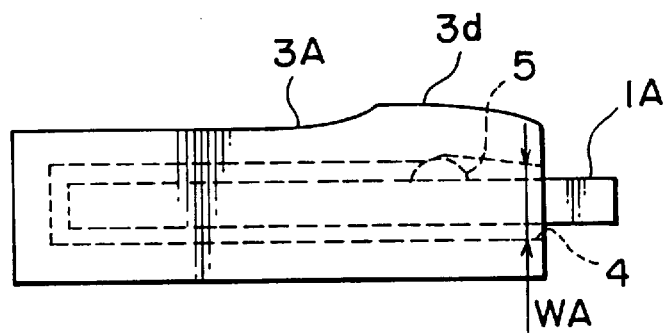
FIG. 7 is a side elevational view showing schematically a state where the IC card is inserted erroneously in a conventional IC card connector known heretofore.

In this manner, owing to the arrangement that the grooves 35 and 36 are provided in the IC card receiving port 32 in correspondence with the embossed data rows 5 and 6 of the IC card 1A, respectively, the erroneous insertion preventing mechanism for the IC card 1 A can prevent even forcible insertion of the IC card 1A in the wrong direction. Thus, the distortion 3d described before (FIG. 7) can be prevented. This in turn means that the contact failure due to insufficient contact pressure between the contact pin array 37 mounted on the connector body 31 and the contact array 11A incorporated in the IC card 1A can be avoided.

It should further be mentioned that because solely the simple grooves 35 and 36 are additionally provided in association with the IC card receiving port 32 without need for providing additionally any especial expensive mechanism to this end, the IC card connector 30 can be manufactured at low cost.

Furthermore, because only the portions of the connector body 31 corresponding to the grooves 35 and 36 along which the embossed data rows 5 and 6 are guided are formed thin with other portions being formed thick, a sufficient mechanical strength can be ensured for the IC card connector 30 while allowing it to be realized in a thin and a small-size structure.

Besides, it should be mentioned that because there is no need for imparting any especial shape such as notch to the IC card 1A destined to be inserted into the IC card connector 30, conventional IC card connector having the embossed data rows 5 and 6 can be used.

Embodiment 2

In conjunction with the first embodiment of the invention, no description has been made concerning the practical application of the IC card connector 30. In accordance with the teachings of the invention incarnated in a second embodiment, it is taught to use the IC card connector 30 as an automobile-onboard terminal in combination with an automated road toll charging/collecting system which is attracting attention in recent years.

Thus, according to the second embodiment of the present invention, inherent data unique to individual users registered in an automated road toll charging/collecting system is stored in a memory incorporated in the relevant IC card 1A accommodated within the connector body 31, wherein the connector body 31 mounted on a motor vehicle or automobile as an automobile-onboard terminal for the automated road toll charging/collecting system is so designed as to read out the inherent data from the IC card 1A.

The IC card 1A can be used not only as the IC card for the automated road toll charging/collecting system but also as an IC card or credit card. Thus, the IC card according to the present invention can be used additionally as a payment card for gasoline service station and for other purposes. Utilization of the IC card can thus be enhanced.

Modification

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact construction and operation illustrated and described.

By way of example, the first embodiment of the present invention is directed to the IC card connector 30 designed for identifying the IC card 1A having two discrete embossed data rows 5 and 6. However, the IC card connector can be easily so modified as to be compatible with the IC card having a single embossed data row. Besides, it goes without saying that the IC card connector 30 can be used in combination with the IC card having no embossed data row formed therein because no groove is formed in the mount for the contact pin array 37 which is brought into contact with the contact array of the IC card.

Accordingly, all suitable modifications and equivalents may be resorted to, falling within the spirit and scope of the invention.

What is claimed is:

1. An IC card connector system including a connector body and an IC card wherein the IC card is adapted to be accommodated in the connector body, comprising:

a contact array and embossed data rows provided on said IC card;

an IC card receiving port provided at one end of said connector body for receiving said IC card;

guide means provided at both sides of said IC card receiving port for guiding insertion of said IC card along both lateral edge portions thereof;

grooves formed in portions of said connector body along the direction in which said IC card is inserted so that said embossed data rows move through said grooves; and a contact pin array incorporated in said connector body for making electric contact with said contact array of said IC card accommodated within said connector body, wherein said IC card receiving port in combination with said grooves serves as an erroneous insertion preventing mechanism for preventing erroneous insertion of said IC card.

2. An IC card connector system according to claim 1, wherein said embossed data rows are formed at a plurality of locations distanced one another in a direction orthogonal to an inserting direction in which said IC card is inserted into said IC card receiving port, and wherein said grooves of said connector body are formed at a plurality of locations corresponding to said embossed data rows.

3. An IC card connector system according to claim 2, wherein said embossed data rows of said IC card to be inserted into said connector body are provided at opposing sides of said contact array, and wherein widths of said embossed data rows differ from each other, and wherein widths of said grooves formed in said connector body differ from each other and correspond to the widths of said embossed data rows.

4. An IC card connector system according to claim 1, wherein said IC card adapted to be inserted into said connector body carries pertinent data for an automated road toll charging/collecting system, and wherein said connector body is mounted on a motor vehicle as an onboard terminal for said automated road toll charging/collecting system.

* * * * *